(12) United States Patent
Dan

(10) Patent No.: US 8,247,133 B2
(45) Date of Patent: Aug. 21, 2012

(54) FUEL CELL

(75) Inventor: Koji Dan, Niiza (JP)

(73) Assignee: Honda Motor Co., Ltd., Tokyo (JP)

( * ) Notice: Subject to any disclaimer, the term of this patent is extended or adjusted under 35 U.S.C. 154(b) by 772 days.

(21) Appl. No.: 12/159,180

(22) PCT Filed: Dec. 11, 2006

(86) PCT No.: PCT/JP2006/325120
§ 371 (c)(1),
(2), (4) Date: Jun. 25, 2008

(87) PCT Pub. No.: WO2007/077723
PCT Pub. Date: Jul. 12, 2007

(65) Prior Publication Data
US 2010/0239954 A1    Sep. 23, 2010

(30) Foreign Application Priority Data

Dec. 28, 2005    (JP) ................................ 2005-378170

(51) Int. Cl.
*H01M 8/02*    (2006.01)
(52) U.S. Cl. ......... 429/513; 429/454; 429/455; 429/456
(58) Field of Classification Search .................. 429/513, 429/454, 455, 456
See application file for complete search history.

(56) References Cited

U.S. PATENT DOCUMENTS

| | | | |
|---|---|---|---|
| 4,910,100 | A | 3/1990 | Nakanishi et al. |
| 4,978,591 | A | 12/1990 | Wright |
| 2005/0164071 | A1 | 7/2005 | Horiguchi |
| 2007/0243441 | A1 | 10/2007 | Tsunoda |

FOREIGN PATENT DOCUMENTS

| | | |
|---|---|---|
| JP | 7-296832 | 11/1995 |
| JP | 10-223240 | 8/1998 |
| JP | 2001-223014 | 8/2001 |
| JP | 2002-203588 | 7/2002 |
| JP | 2004-207067 | 7/2004 |
| JP | 2004-259649 | 9/2004 |
| JP | 2004-281353 | 10/2004 |
| JP | 2005-209622 | 8/2005 |
| JP | 2005-294180 | 10/2005 |
| JP | 2005-339878 | 12/2005 |
| WO | WO-02/37592 A1 | 5/2002 |
| WO | WO-02/065565 A2 | 8/2002 |

OTHER PUBLICATIONS

Japanese Office Action for Application No. 2005-378170, dated Jan. 26, 2010.

*Primary Examiner* — Jane Rhee
(74) *Attorney, Agent, or Firm* — Nelson Mullins Riley & Scarborough LLP; Anthony A. Laurentano

(57) ABSTRACT

A fuel cell includes a separator having circular disks. On a surface of each of the circular disks, a fuel gas channel is provided for supplying a fuel gas to an anode. The fuel gas channel includes ring shaped grooves and ridges provided alternately, wherein the width of the ring shaped grooves gradually increases outwardly from a fuel gas inlet.

11 Claims, 20 Drawing Sheets

→ FUEL GAS
→ OXYGEN-CONTAINING GAS

FIG. 10

| | WIDTH | OUTER DIAMETER | INNER DIAMETER | LEAKAGE RATIO [%] |
|---|---|---|---|---|
| RIDGE 134g | 7.0 | 50.0 | 43.0 | 4.0 |
| GROOVE 132f | 8.4 | 43.0 | 34.6 | |
| RIDGE 134f | 5.0 | 34.6 | 29.6 | 4.0 |
| GROOVE 132e | 6.0 | 29.6 | 23.6 | |
| RIDGE 134e | 3.4 | 23.6 | 20.2 | 4.0 |
| GROOVE 132d | 4.0 | 20.2 | 16.2 | |
| RIDGE 134d | 2.3 | 16.2 | 13.9 | 4.0 |
| GROOVE 132c | 2.8 | 13.9 | 11.1 | |
| RIDGE 134c | 1.6 | 11.1 | 9.5 | 4.0 |
| GROOVE 132b | 1.9 | 9.5 | 7.6 | |
| RIDGE 134b | 1.1 | 7.6 | 6.5 | 4.0 |
| GROOVE 132a | 1.3 | 6.5 | 5.2 | |
| RIDGE 134a | 0.7 | 5.2 | 4.5 | 4.0 |
| CIRCULAR GROOVE 51 | 4.5 | 4.5 | 0 | |

FIG. 11
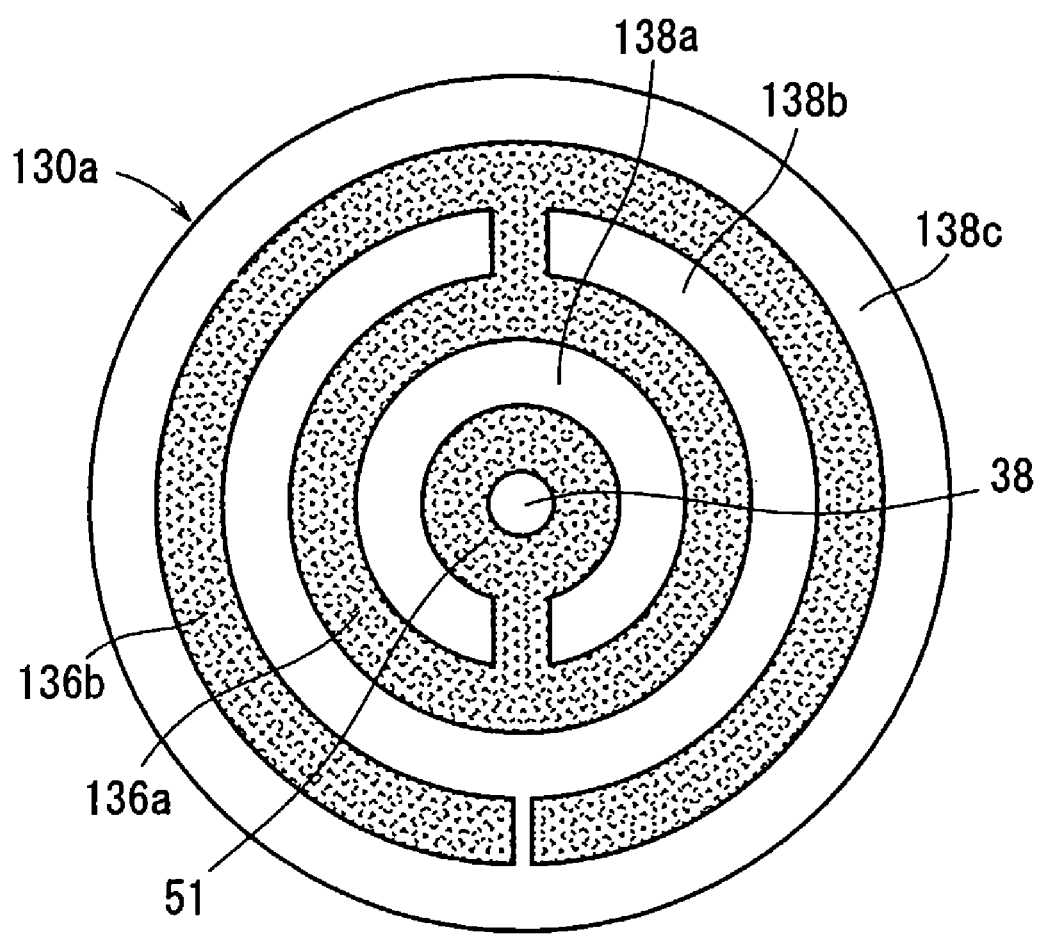
 GROOVE SHAPE

FIG. 12

|  | WIDTH | OUTER DIAMETER | INNER DIAMETER | LEAKAGE RATIO [%] |
|---|---|---|---|---|
| RIDGE 138c | 7.0 | 50.0 | 43.0 | 4.1 |
| GROOVE 136b | 8.3 | 43.0 | 34.7 | |
| RIDGE 138b | 7.0 | 34.7 | 27.7 | 2.5 |
| GROOVE 136a | 8.3 | 27.7 | 19.4 | |
| RIDGE 138a | 7.0 | 19.4 | 12.4 | 0.7 |
| CIRCULAR GROOVE 51 | 12.4 | 12.4 | 0.0 | |

FIG. 13
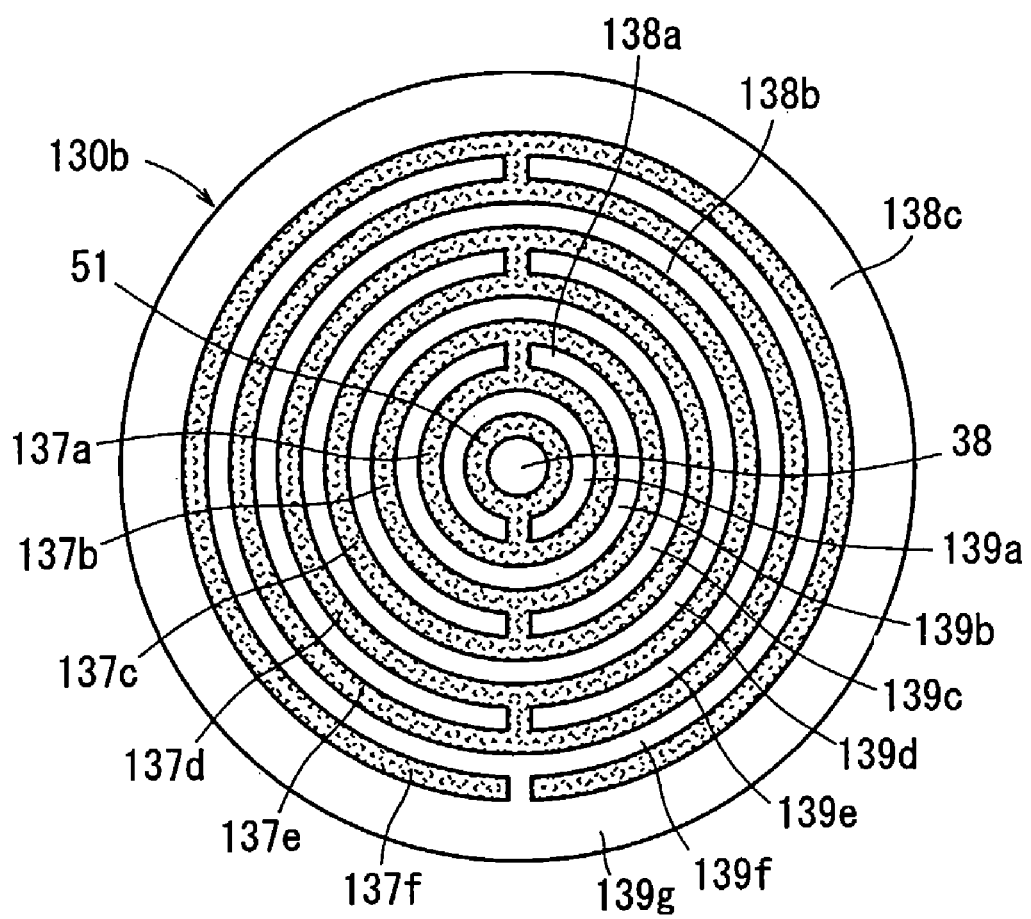
 GROOVE SHAPE

FIG. 14

|  | WIDTH | OUTER DIAMETER | INNER DIAMETER | LEAKAGE RATIO [%] |
|---|---|---|---|---|
| RIDGE 139g | 7.0 | 50.0 | 43.0 | 12.5 |
| GROOVE 137f | 3.0 | 43.0 | 40.0 |  |
| RIDGE 139f | 3.0 | 40.0 | 37.0 | 21.3 |
| GROOVE 137e | 3.0 | 37.0 | 34.0 |  |
| RIDGE 139e | 3.0 | 34.0 | 31.0 | 15.4 |
| GROOVE 137d | 3.0 | 31.0 | 28.0 |  |
| RIDGE 139d | 3.0 | 28.0 | 25.0 | 10.5 |
| GROOVE 137c | 3.0 | 25.0 | 22.0 |  |
| RIDGE 139c | 3.0 | 22.0 | 19.0 | 6.5 |
| GROOVE 137b | 3.0 | 19.0 | 16.0 |  |
| RIDGE 139b | 3.0 | 16.0 | 13.0 | 3.4 |
| GROOVE 137a | 3.0 | 13.0 | 10.0 |  |
| RIDGE 139a | 3.0 | 10.0 | 7.0 | 1.2 |
| CIRCULAR GROOVE 51 | 7.0 | 7.0 | 0.0 |  |

FUEL CELL

RELATED APPLICATIONS

This application is a 35 U.S.C. 371 national stage filing of International Application No. PCT/JP2006/325120, filed 11 Dec. 2006, which claims priority to Japanese Patent Application No. 2005-378170 filed on 28 Dec. 2005 in Japan. The contents of the aforementioned applications are hereby incorporated by reference.

TECHNICAL FIELD

The present invention relates to a fuel cell formed by stacking an electrolyte electrode assembly and a separator. The electrolyte electrode assembly includes an anode, a cathode, and an electrolyte interposed between the anode and the cathode.

BACKGROUND ART

Typically, a solid oxide fuel cell (SOFC) having a seal free structure employs an electrolyte made up of an ion-conductive solid oxide such as stabilized zirconia. The electrolyte is interposed between an anode and a cathode to form an electrolyte electrode assembly. The electrolyte electrode assembly is interposed between separators (bipolar plates). In use, a predetermined number of electrolyte electrode assemblies and separators are stacked together to form a fuel cell stack.

In the fuel cell, a fuel gas channel and an oxygen-containing gas channel are formed on the separator, in order to supply a fuel gas (e.g., hydrogen gas) and an oxygen-containing gas (e.g., air), respectively, to the anode and cathode of the electrolyte electrode assembly. In order to increase the length of the grooves in the fuel gas channel and the oxygen-containing gas channel, the grooves have a serpentine pattern instead of a straight pattern.

For example, Japanese Laid-Open Patent Publication No. 2002-203588 discloses a solid oxide fuel cell, as shown in FIG. 20, wherein the solid oxide fuel cell has a separator 1 interposed between power generation cells (not shown). A fuel gas supply pipe 2 and an air supply pipe 3 are connected to opposite ends of the separator 1. A fuel hole 4 connected to the fuel supply pipe 2 is formed at a center portion of the separator, on a surface thereof facing a fuel electrode current collector (not shown). Three slits 5a, 5b, 5c are provided, which extend from the fuel hole 4 in a spiral pattern.

However, in the conventional technique, in which slits 5a, 5b, 5c having a spiral pattern are provided, the length of the slits 5a, 5b, 5c, when making one circle around the separator 1, grows larger toward the outer circumferential side of the separator 1 (i.e., the outer circumferential side of the electrode surface). Therefore, when the slits 5a, 5b, 5c are provided in such a spiral pattern, pressure loss is larger in the outer circumferential side as compared with the inner side of the separator. Therefore, leakage of the reactant gas occurs easily from the groove on the inner side to the groove on the outer circumferential side, as well as from the outermost groove to the outside of the electrode surface. This occurs because the reactant gas pressure in the groove on the inner side is relatively higher than the reactant gas pressure in the groove on the outer circumferential side.

Thus, distribution of the reactant gas supplied to the electrode surface becomes non-uniform, and a uniform power generation reaction cannot be achieved. Furthermore, leakage of reactant gas occurs in the outermost groove, such that the reactant gas utilization ratio becomes quite low.

DISCLOSURE OF INVENTION

The present invention has been made with the aim of solving the above problems, wherein an object of the present invention is to provide a fuel cell having a simple structure in which it is possible to uniformly and suitably supply a reactant gas over the entire electrode surface of an electrolyte electrode assembly. Accordingly, a uniform power generation reaction can be achieved, while also improving the reactant gas utilization ratio.

The present invention, relates to a fuel cell formed by stacking an electrolyte electrode assembly and a separator. The electrolyte electrode assembly includes an anode, a cathode, and an electrolyte interposed between the anode and the cathode. A fuel gas channel is formed on one surface of the separator for supplying a fuel gas from a center to an outer circumferential portion along a surface of the anode, and an oxygen-containing gas channel is formed on the other surface of the separator for supplying an oxygen-containing gas along a surface of the cathode. The separator has a fuel gas inlet for supplying the fuel gas before consumption to the fuel gas channel.

The fuel gas channel comprises grooves and ridges provided alternately toward the outer circumferential portion on the surface of the anode, wherein a groove width of adjacent grooves arranged between the ridges increases gradually toward the outer circumferential portion on the surface of the anode.

Preferably, the adjacent grooves arranged between the ridges have a same leakage ratio over the entire surface of the anode.

The leakage ratio herein basically implies a ratio (leakage ratio=Wr/Wh) of the flow rate Wr of the fuel gas, which is leaked from the fuel gas channel, to the entire flow rate Wh of the fuel gas supplied to the fuel gas channel.

Preferably, an opening area of the grooves and a surface area of the ridges are the same over the entire surface of the anode. With this structure, the fuel gas is distributed uniformly over the entire anode, power collecting performance is maximized, and the load in the stacking direction can be transmitted easily.

Further, preferably, the fuel gas inlet is provided at a position corresponding to the center of the surface of the anode. With this structure, the fuel gas flows uniformly from the center to the outer circumferential portion of the anode, and the fuel gas is supplied over the entire surface of the anode.

Further, preferably, the grooves comprise a plurality of ring shaped grooves formed around the fuel gas inlet and a connection groove connecting adjacent ring shaped grooves. Alternatively, the grooves may comprise a continuous groove extending in a spiral pattern around the fuel gas inlet, or a plurality of grooves branched from the fuel gas inlet, and extending in a serpentine pattern toward the outer circumferential portion on the surface of the anode.

Further, preferably, the fuel cell further comprises a fuel gas channel member provided on the other surface of the separator, and having a fuel gas supply channel for supplying the fuel gas to the fuel gas inlet.

Further, preferably, a fuel gas channel member is provided on the one surface or on the other surface of the separator, and the fuel gas channel member forms a fuel gas supply channel for supplying the fuel gas to the fuel gas inlet.

Further, preferably, the oxygen-containing gas channel comprises a deformable elastic channel member, which is provided on the other surface of the separator, in tight contact with the cathode. With this structure, the cathode tightly contacts the separator in a suitable manner, whereby an improvement in the performance of collecting electricity from the fuel cell can be achieved.

Further, preferably, an area in which the elastic channel member is disposed is smaller than a power generation area of the anode. With this structure, even if exhaust gas flows around to the anode of the electrolyte electrode assembly, the power generation area is not present on the outer circumferential edge of the cathode opposite to the outer circumferential edge of the anode. Therefore, it is possible to prevent losses in the collected electricity, whereby an improvement in the performance of collecting electricity from the fuel cell can be achieved.

Further, preferably, the elastic channel member comprises an electrically conductive mesh member. In this case, the structure is both simplified and economically advantageous.

Further, preferably, the oxygen-containing gas channel is formed by a plurality of protrusions provided on the other surface of the separator. Accordingly, the load in the stacking direction is efficiently transmitted through such protrusions, and an improvement in the performance of collecting electricity from the fuel cell can be achieved.

Further, preferably, the protrusions comprise a plurality of solid portions formed on one surface of the separator by etching. Thus, the shape and positions of the protrusions can be changed arbitrarily and easily. Further, deformation of the protrusions is prevented, the load is transmitted effectively, and an improvement in the performance of collecting electricity from the fuel cell can be achieved.

In the present invention, the width of the adjacent grooves, which are arranged respectively between the ridges, increases gradually toward the outer circumferential portion of the electrode surface. Therefore, it is possible to prevent fuel gas pressure loss from increasing in the outer circumferential portion of the electrode surface. Therefore, fluctuations in the leakage amount of the fuel gas are suppressed effectively, and it is possible to prevent the fuel gas from leaking outside of the electrolyte electrode assembly from the outer circumferential portion of the electrode surface.

Accordingly, with a simple structure, it is possible to uniformly and suitably supply a reactant gas over the entire electrode surface of an electrolyte electrode assembly, thereby achieving a uniform power generation reaction and improving the reactant gas utilization ratio.

BRIEF DESCRIPTION OF DRAWINGS

FIG. 10 is a table showing conditions in the embodiment of the present invention;

FIG. 11 is a view showing a first comparative example;

FIG. 12 is a table showing settings used in the first comparative example;

FIG. 13 is a view showing a second comparative example;

FIG. 14 is a table showing settings used in the second comparative example;

BEST MODE FOR CARRYING OUT THE INVENTION

Figure 1:
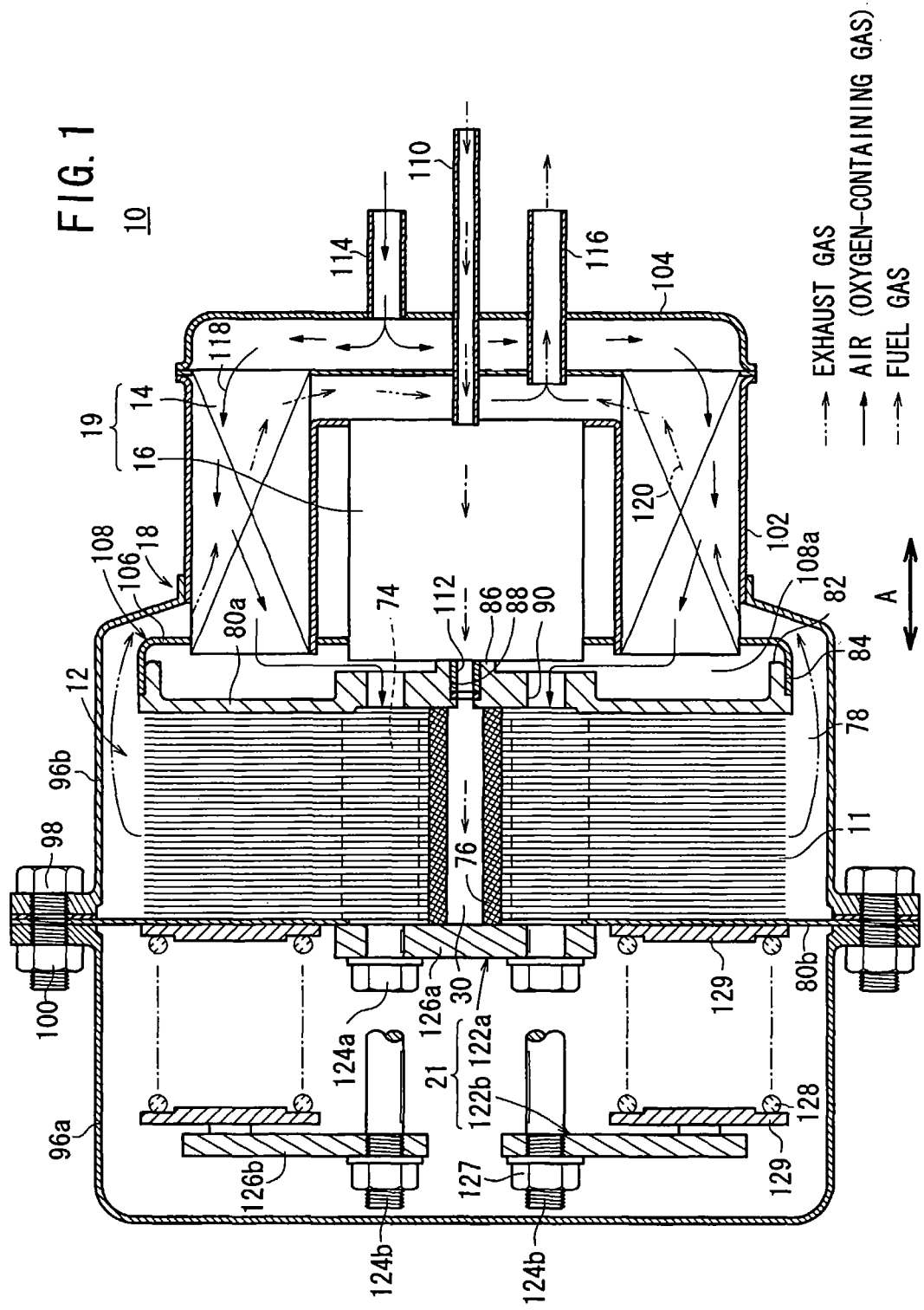
FIG. 1 is a partial cross sectional view showing a fuel cell system according to a first embodiment of the present invention.
Figure 2:
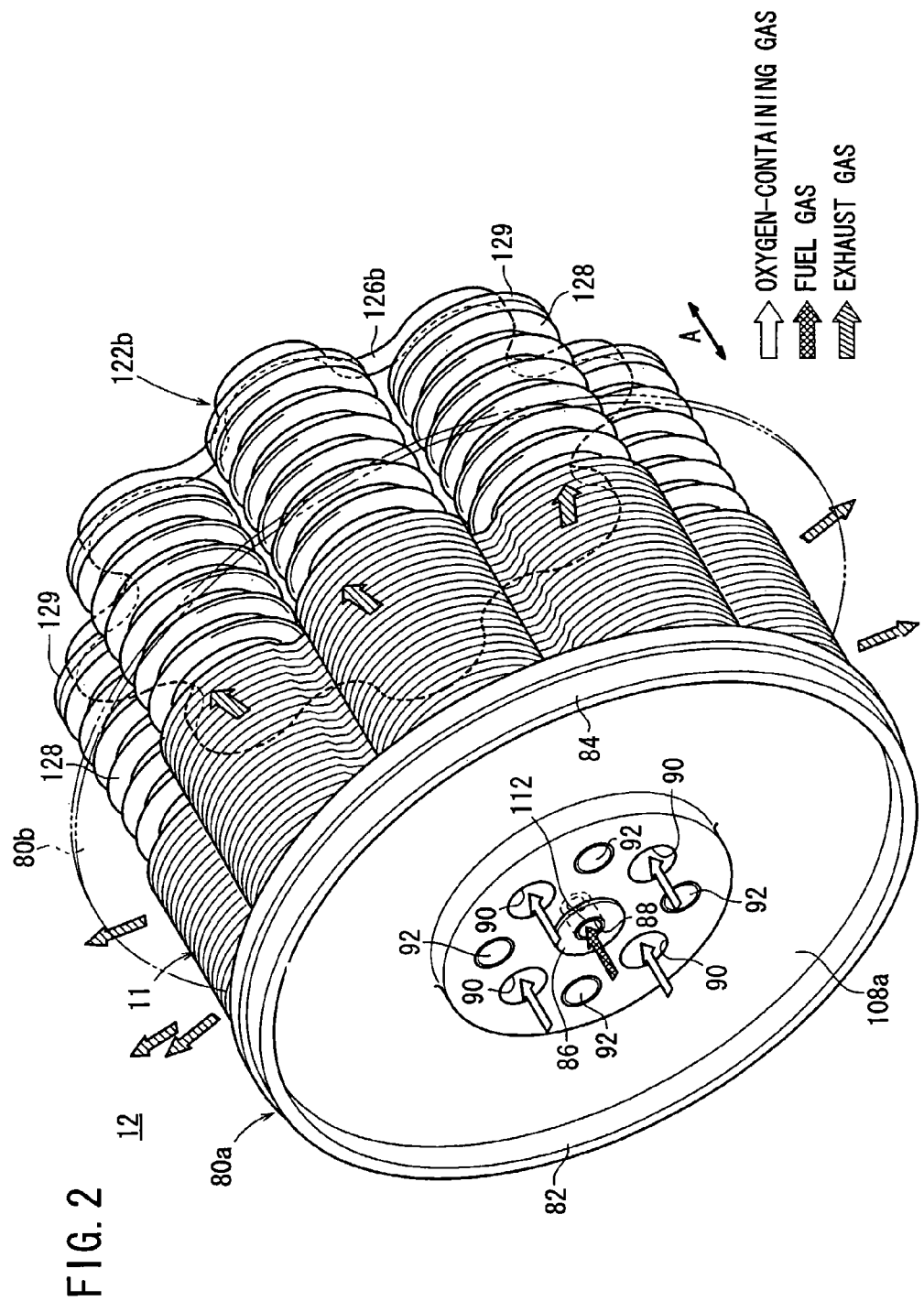
FIG. 2 is a perspective view schematically showing a fuel cell stack of the fuel cell system.

FIG. 1 is a partial cross sectional view showing a fuel cell system 10, including a fuel cell 11 according to a first embodiment of the present invention. FIG. 2 is a perspective view schematically showing a fuel cell stack 12 formed by stacking a plurality of the fuel cells 11, in a direction indicated by the arrow A.

The fuel cell system 10 is used in various applications, including stationary and mobile applications. For example, the fuel cell system 10 may be mounted on a vehicle. As shown in FIG. 1, the fuel cell system 10 includes the fuel cell stack 12, a heat exchanger 14, a reformer 16, and a casing 18. The heat exchanger 14 heats an oxygen-containing gas before it is supplied to the fuel cell stack 12. The reformer 16 reforms fuel in order to produce a fuel gas. The fuel cell stack 12, the heat exchanger 14, and the reformer 16 are disposed within the casing 18.

In the casing 18, a fluid unit 19, including at least the heat exchanger 14 and the reformer 16, is disposed on one side of the fuel cell stack 12, and a load applying mechanism 21, which applies a tightening load to the fuel cells 11 in the stacking direction indicated by the arrow A, is disposed on the other side of the fuel cell stack 12. The fluid unit 19 and the load applying mechanism 21 are provided symmetrically with respect to a central axis of the fuel cell stack 12.

Figure 3:
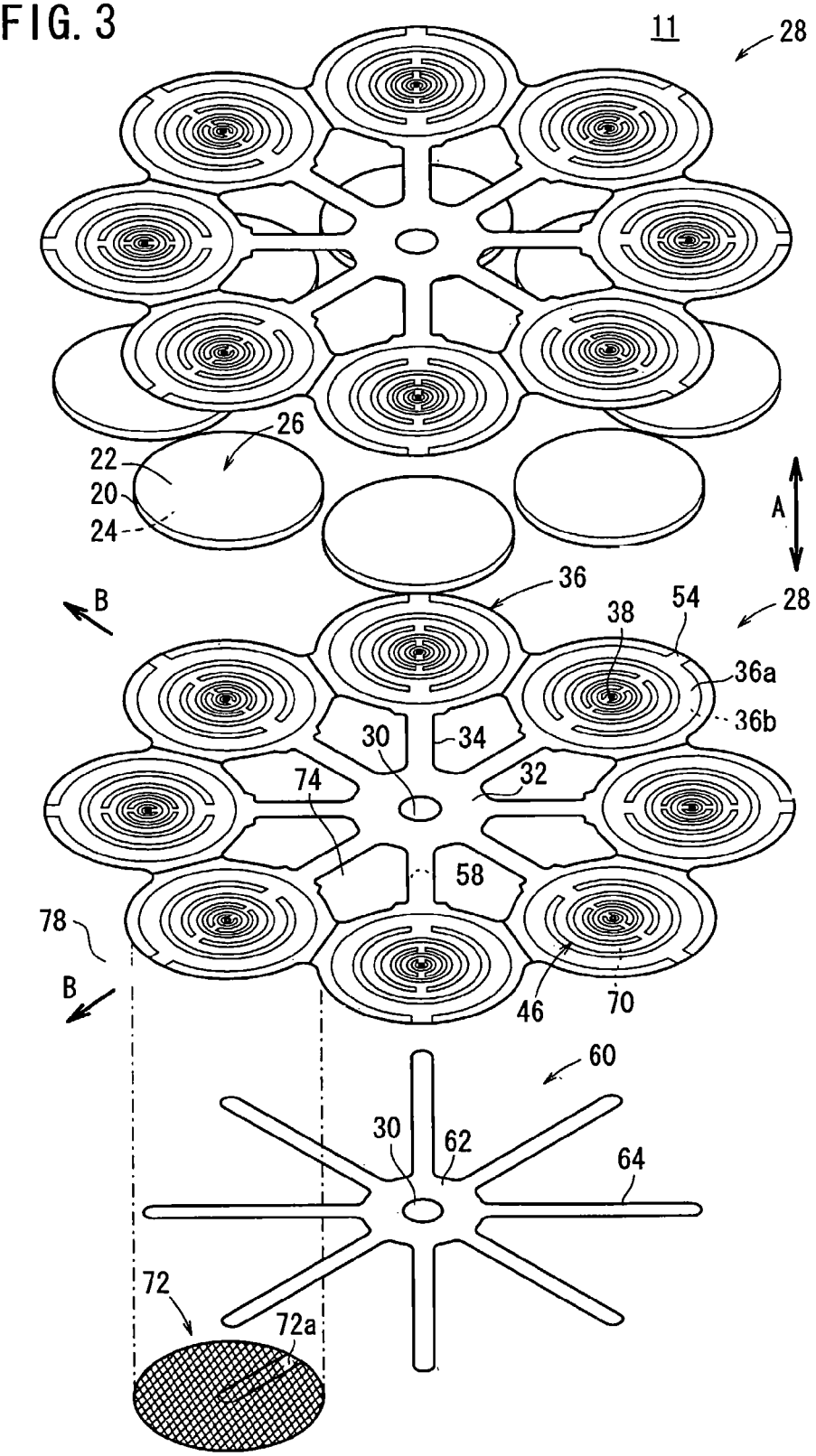
FIG. 3 is an exploded perspective view showing a fuel cell of the fuel cell stack.
Figure 4:
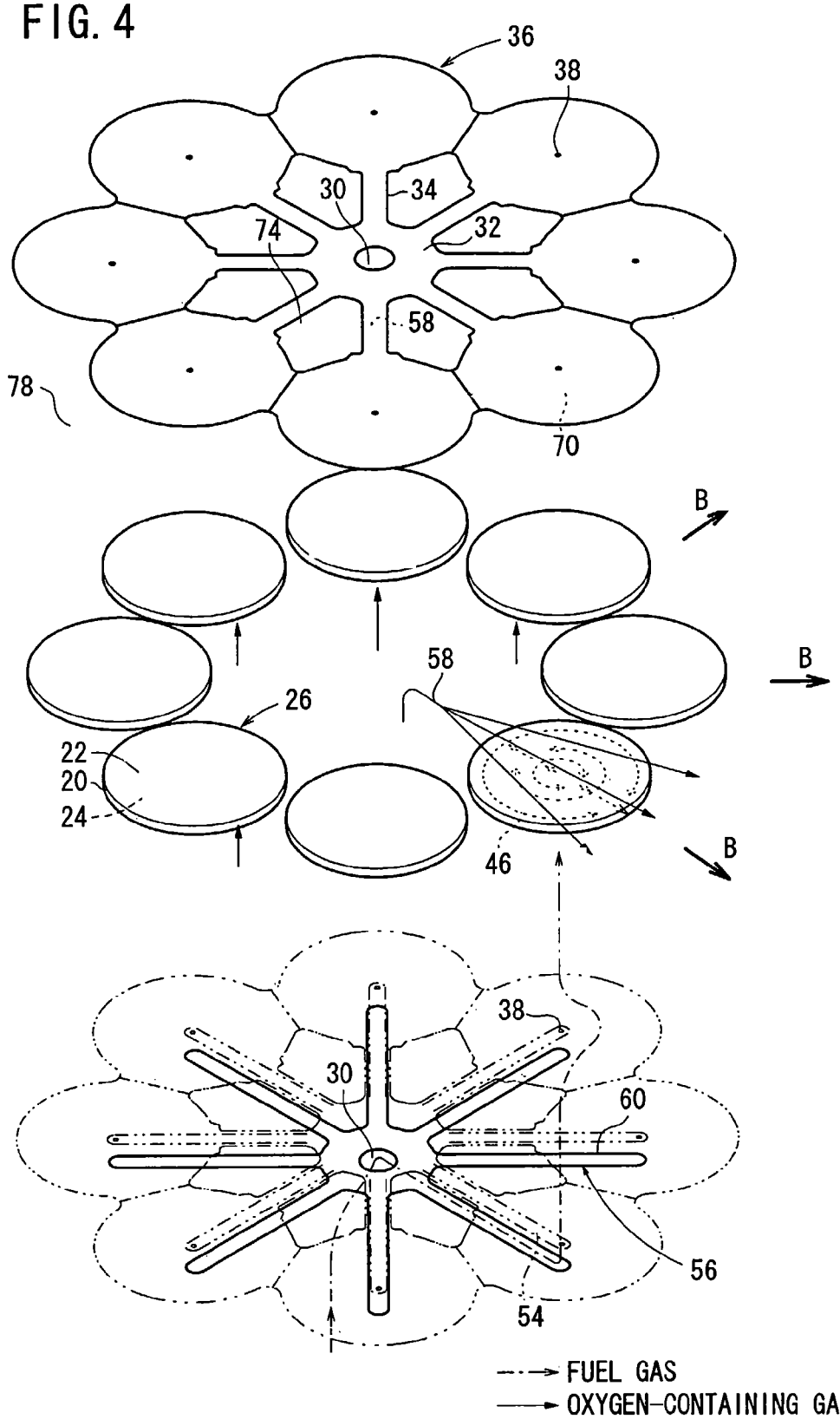
FIG. 4 is a partial exploded perspective view showing gas flows within the fuel cell.

The fuel cell 11 is a solid oxide fuel cell (SOFC). As shown in FIGS. 3 and 4, the fuel cell 11 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of an ion-conductive solid oxide such as stabilized zirconia. The electrolyte electrode assembly 26 has a circular disk shape. A barrier layer (not shown) is provided at least on the outer circumferential edge of the electrolyte electrode assembly 26 in order to prevent the entry and emission of the oxygen-containing gas and the fuel gas.

A plurality of, e.g., eight, electrolyte electrode assemblies 26 are sandwiched between a pair of separators 28 to form the fuel cell 11. The eight electrolyte electrode assemblies 26 are concentric with respect to a fuel gas supply passage (fuel gas supply unit) 30 that extends through the center of the separators 28.

In FIG. 3, for example, each of the separators 28 comprises a single metal plate of, e.g., a stainless alloy or a carbon plate. The separator 28 has a first small diameter end portion 32. The fuel gas supply passage 30 extends through the center of the first small diameter end portion 32. The first small diameter end portion 32 is formed integrally together with circular disks 36 through a plurality of first bridges 34. The first bridges 34 extend radially outwardly from the first small diameter end portion 32 at equal angles (intervals).

The circular disk 36 and the electrolyte electrode assembly 26 are of substantially the same size. A fuel gas inlet 38 for supplying the fuel gas is formed at the center of the circular disk 36, or at an upstream position that is deviated from the center of the circular disk 36 in the flow direction of the oxygen-containing gas.

Figure 5:
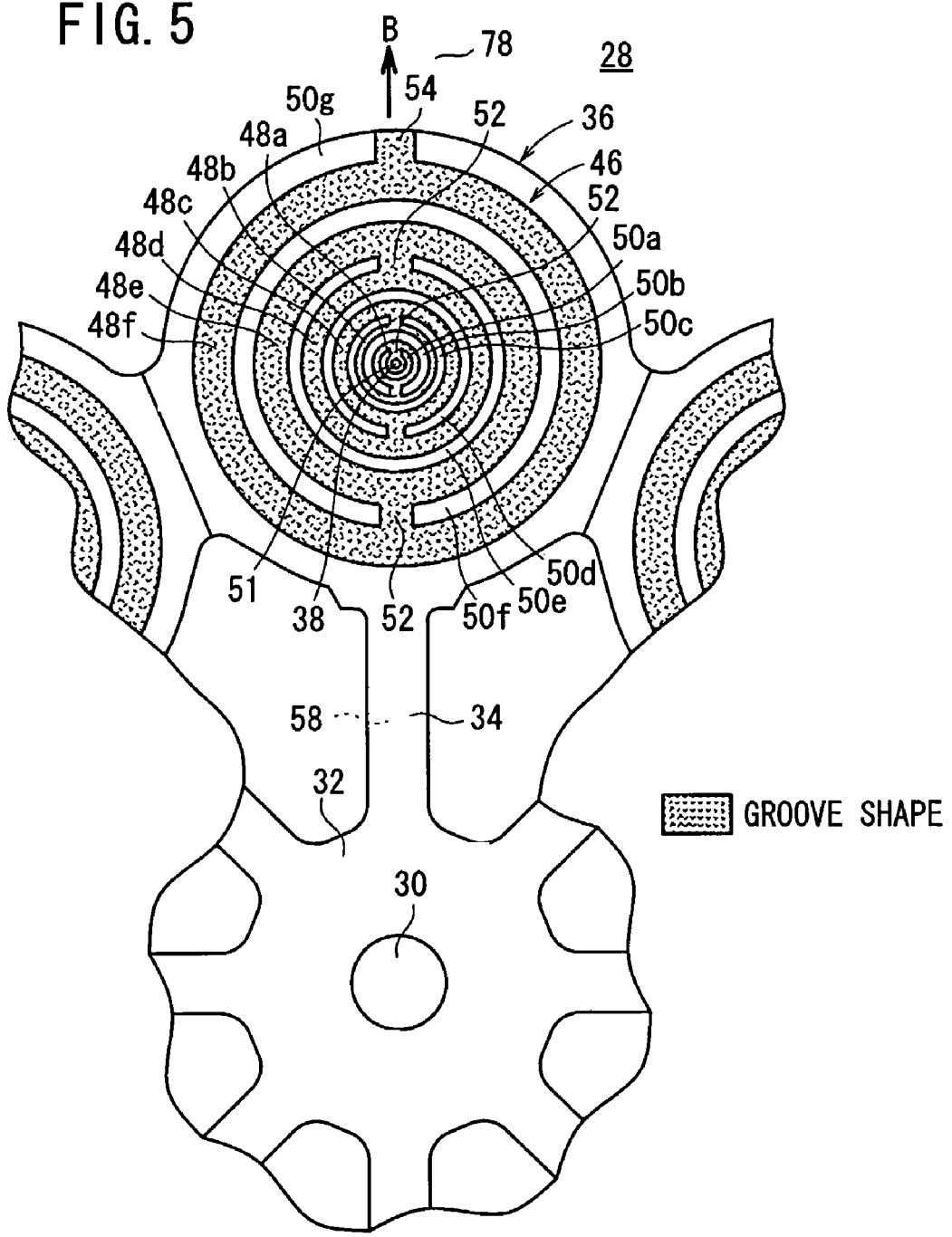
FIG. 5 is a partial enlarged view showing one surface of a separator.

Each of the circular disks 36 includes a fuel gas channel 46 on its surface 36a, which contacts the anode 24 in order to supply a fuel gas along a surface of the anode 24. As shown in FIG. 5, the fuel gas channel 46 includes a plurality of ring shaped grooves 48a to 48f formed concentrically around the fuel gas inlet 38 on the circular disk 36, and ridges 50a to 50g. The ring shaped grooves 48a to 48f and the ridges 50a to 50g are formed alternately.

The ring shaped groove 48a having the smallest diameter is connected to a circular groove 51 around the fuel gas inlet 38 through a connection groove 52. The diameters of the ring shaped grooves 48a to 48f become larger toward the outside, from the ring shaped groove 48a to the ring shaped groove 48f. The ring shaped grooves 48a to 48f are connected together through connection grooves 52, which are arranged on the front side and back side alternately, in the direction indicated by the arrow B.

The groove width of the ring shaped grooves 48a to 48f arranged between the ridges 50a to 50g increases gradually toward the outer circumferential portion on the surface of the anode 24, in the direction indicated by the arrow B. Likewise, the width of the ridges 50a to 50g increases gradually toward the outer circumferential portion on the surface of the anode 24.

Specifically, the leakage ratio of the fuel gas, which leaks from the ring shaped grooves 48a to 48f to the ridges 50b to 50g, is substantially the same over the entire surface of the anode 24. Stated otherwise, the opening area of the ring shaped grooves 48a to 48f is equal to the surface area of the ridges 50b to 50g over the entire electrode surface of the anode 24. It should also be noted that the opening area of the circular groove 51 is equal to the surface area of the ridge 50a. The ring shaped groove 48f having the largest diameter is connected to a discharge groove 54 at its front end, in the direction indicated by the arrow B.

Figure 6:
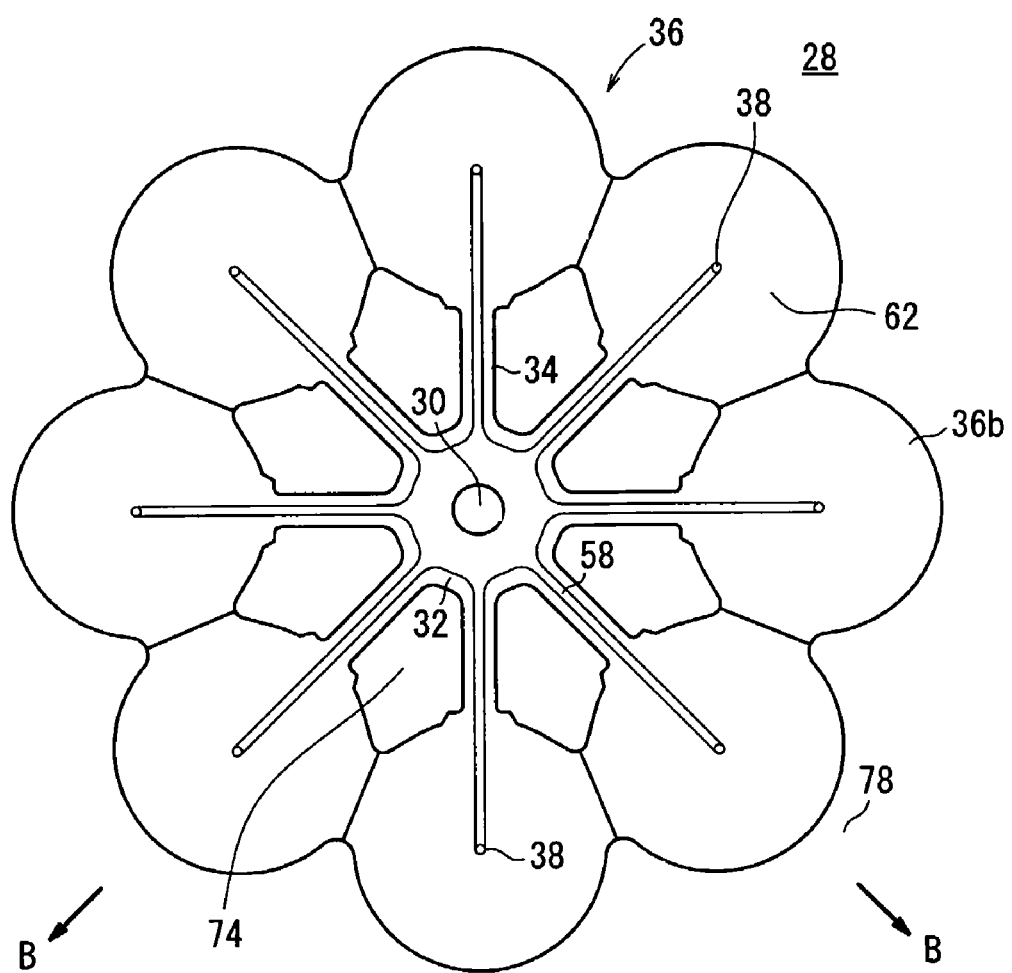
FIG. 6 is a view showing the other surface of the separator.

As shown in FIG. 6, each of the circular disks 36 has a planar surface 36b, which contacts the cathode 22. A fuel gas supply channel 58 extends from the first small diameter end portion 32 to the first bridge 34. The fuel gas supply channel 58 connects the fuel gas supply passage 30 to the fuel gas inlet 38. For example, the fuel gas supply channel 58 may be formed by etching.

As shown in FIG. 3, a channel member 60 is fixed to the separator 28, e.g., by brazing or laser welding, on a surface facing the cathode 22. The channel member 60 has a planar shape, and includes a second small diameter end portion 62. The fuel gas supply passage 30 extends through the center of the second small diameter end portion 62. Eight second bridges 64 extend radially from the second small diameter end portion 62. Each of the second bridges 64 is fixed to the separator 28, extending from the first bridge 34 to the surface 36b of the circular disk 36, and covering the fuel gas inlet 38 (see FIG. 7).

On the surface 36b of the circular disk 36, a deformable elastic channel member, such as an electrically conductive mesh member 72, is provided. The electrically conductive mesh member 72 forms an oxygen-containing gas channel 70 for supplying an oxygen-containing gas along a surface of the cathode 22, and the electrically conductive mesh member 72 is maintained in tight contact with the cathode 22.

For example, the mesh member 72 may be made of stainless steel wire rods, and has a circular disk shape. The thickness of the mesh member 72 is determined such that the mesh member 72 can be deformed elastically when a load in the stacking direction (indicated by the arrow A) is applied to the mesh member 72. The mesh member 72 directly contacts the surface 36b of the circular disk 36, and has a cutout 72a, which serves as a space for providing the channel member 60 (see FIGS. 3 and 7).

Figure 7:
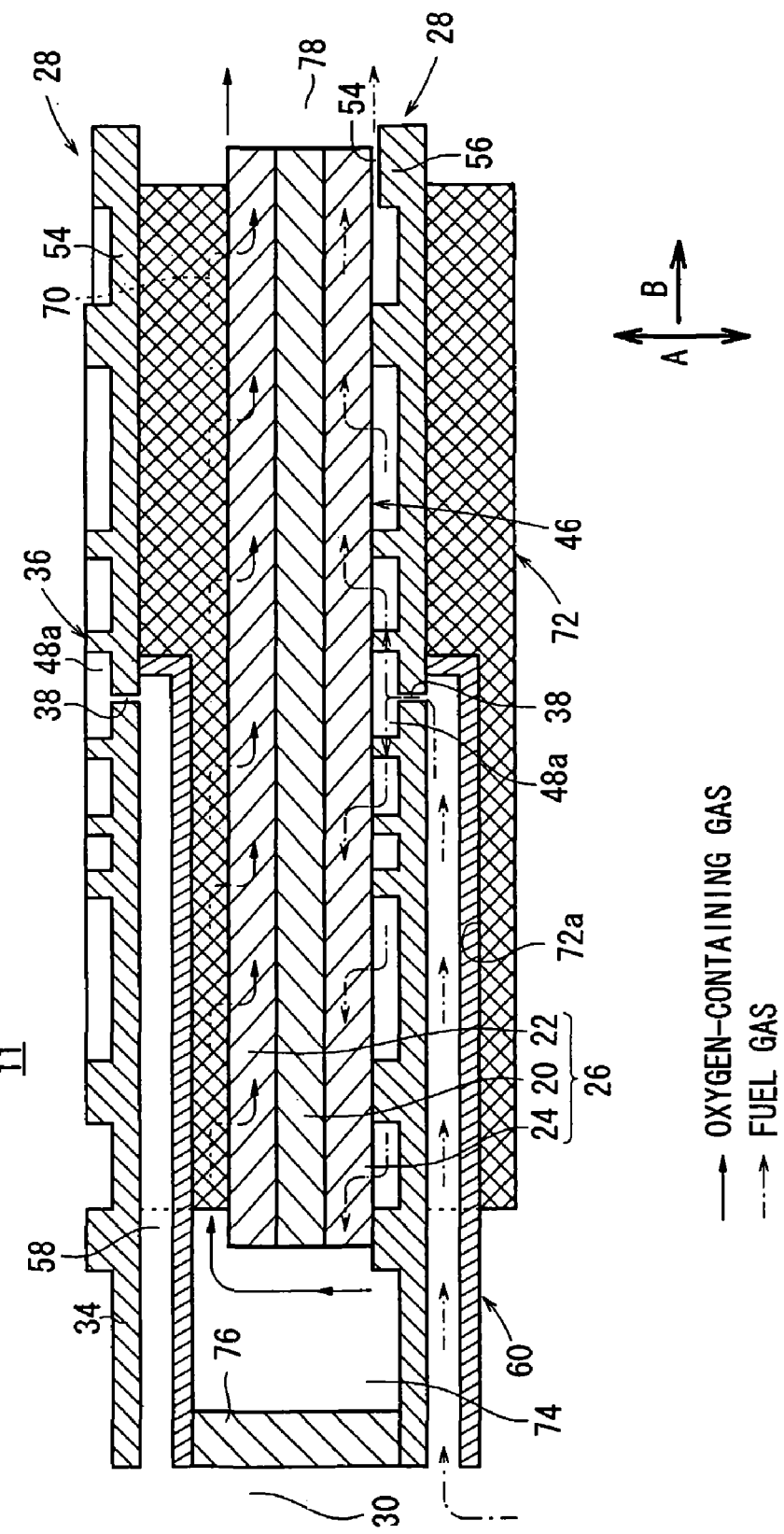
FIG. 7 is a cross sectional view schematically showing operations of the fuel cell.

As shown in FIG. 7, the area in which the mesh member 72 is disposed is smaller than the power generation area of the anode 24. The oxygen-containing gas channel 70, which is formed in the mesh member 72, is connected to the oxygen-containing gas supply unit 74. The oxygen-containing gas is supplied in the direction indicated by the arrow B, through the space between the inner circumferential edge of the electrolyte electrode assembly 26 and the inner circumferential edge of the circular disk 36. The oxygen-containing gas supply unit 74 extends inside the respective circular disks 36 between the first bridges 34, in the stacking direction indicated by the arrow A.

Insulating seals 76 for, sealing the fuel gas supply passage 30 are provided between the separators 28. For example, the insulating seals 76 may be made of a mica material, or a ceramic material. An exhaust gas channel 78 for the fuel cells 11 is formed outside of the circular disks 36.

As shown in FIGS. 1 and 2, the fuel cell stack 12 includes end plates 80a, 80b provided at opposite ends of the fuel cells 11 in the stacking direction. The end plate 80a has a substantially circular disk shape. A ring shaped portion 82 protrudes from the outer circumferential end of the end plate 80a, and a groove 84 is formed around the ring shaped portion 82. A columnar projection 86 is formed at the center of the ring shaped portion 82. The columnar projection 86 protrudes in the same direction as the ring shaped portion 82. A stepped hole 88 is formed at the center of the projection 86.

Holes 90 and screw holes 92 are formed within a same virtual circle around the projection 86. The holes 90 and the screw holes 92 are arranged alternately, while being spaced from each other at predetermined angles (intervals), at positions corresponding to the respective spaces of the oxygen-containing gas supply unit 74 formed between the first and second bridges 34, 64. The diameter of the end plate 80b is larger than the diameter of the end plate 80a. Further, the end plate 80a is an electrically conductive thin plate.

The casing 18 includes a first case unit 96a containing the load applying mechanism 21, and a second case unit 96b containing the fuel cell stack 12. The end plate 80b and an insulating member are sandwiched between the first case unit 96a and the second case unit 96b. The insulating member is provided on the side of the second case unit 96b. The joined portion between the first case unit 96a and the second case unit 96b is tightened by screws 98 and nuts 100. The end plate 80b functions as a gas barrier, which prevents hot exhaust gas or the hot air from the fluid unit 19 from entering into the load applying mechanism 21.

An end of a ring shaped wall plate 102 is joined to the second case unit 96b, and ahead plate 104 is fixed to the other end of the wall plate 102. The fluid unit 19 is disposed symmetrically with respect to the central axis of the fuel cell stack 12. Specifically, the substantially cylindrical reformer 16 is provided coaxially inside of the substantially ring shaped heat exchanger 14.

A wall plate 106 is fixed to the groove 84 around the end plate 80a, so as to form a channel member 108. The heat exchanger 14 and the reformer 16 are directly connected to the channel member 108. A chamber 108a is formed in the channel member 108, wherein the chamber 108a is temporarily filled with air heated by the heat exchanger 14. The holes 90 form openings for supplying the air, which temporally fills the chamber 108a, to the fuel cell stack 12.

A fuel gas supply pipe 110 and a reformed gas supply pipe 112 are connected to the reformer 16. The fuel gas supply pipe 110 extends to the outside from the head plate 104. The reformed gas supply pipe 112 is inserted into the stepped hole 88 of the end plate 80a, and is connected to the fuel gas supply passage 30.

An air supply pipe 114 and an exhaust gas pipe 116 are connected to the head plate 104. A channel 118 extending from the air supply pipe 114, and which is directly opened to the channel member 108 through the heat exchanger 14, and another channel 120 extending from the exhaust gas channel 78 of the fuel cell stack 12 to the exhaust gas pipe 116 through the heat exchanger 14, are provided in the casing 18.

The load applying mechanism 21 includes a first tightening unit 122a for applying a first tightening load T1 to a region around (or near) the fuel gas supply passage 30, and a second tightening unit 122b for applying a second tightening load T2 to the electrolyte electrode assemblies 26. The second tightening load T2 is smaller than the first tightening load T1 (T1>T2).

The first tightening unit 122a includes relatively short first tightening bolts 124a, which are screwed into the screw holes 92 formed along one diagonal line of the end plate 80a. The first tightening bolts 124a extend in the stacking direction of the fuel cells 11, and engage with a first presser plate 126a. The first tightening bolts 124a also are provided in the oxygen-containing gas supply unit 74 extending through the separators 28. The first presser plate 126a is formed by a narrow plate, and engages with a central position of the separator 28 so as to cover the fuel gas supply passage 30.

The second tightening unit 122b includes relatively long second tightening bolts 124b, which are screwed into screw holes 92 formed along the other diagonal line of the end plate 80a. Ends of the second tightening bolts 124b extend through a second presser plate 126b having a curved outer section. Nuts 127 are fitted onto the ends of the second tightening bolts 124b. The second tightening bolts 124b also are provided in the oxygen-containing gas supply unit 74 extending through the separators 28. Springs 128 and spring seats 129 are provided in respective circular portions of the second presser plate 126b, at positions corresponding to the electrolyte electrode assemblies 26 on the circular disks 36 of the fuel cell 11. The springs 128 are ceramic springs, for example.

Next, operation of the fuel cell system 10 shall be described below.

As shown in FIG. 3, when assembling the fuel cell system 10, first, the channel member 60 is joined to the surface of the separator 28 facing the cathode 22. Thus, a fuel gas supply channel 58, which is connected to the fuel gas supply passage 30, is formed between the separator 28 and the channel member 60. The fuel gas supply channel 58 is connected to the fuel gas channel 46 through the fuel gas inlet 38 (see FIG. 7).

Further, the ring shaped insulating seal 76 is provided on each of the separators 28 around the fuel gas supply passage 30. The separator 28 thereby is fabricated. More specifically, eight electrolyte electrode assemblies 26 are interposed between a pair of the separators 28 in order to form the fuel cell 11.

At this time, as shown in FIGS. 3 and 4, the electrolyte electrode assemblies 26 are interposed between the surface 36a of one separator 28 and the surface 36b of the other separator 28. The fuel gas inlet 38 is positioned substantially at a center location in each of the anodes 24. The mesh member 72 is provided between the surface 36b of the separator 28 and the electrolyte electrode assembly 26. The cutout 72a of the mesh member 72 is provided at a position corresponding to the channel member 60.

A plurality of fuel cells 11 are stacked in the direction indicated by the arrow A, and the end plates 80a, 80b are provided at opposite ends in the stacking direction. A desired tightening load is applied to the fuel cell stack 12 through the load applying mechanism 21.

The end plate 80b of the fuel cell stack 12 is sandwiched between the first case unit 96a and the second case unit 96b of the casing 18. The first case unit 96a and the second case unit 96b are fixed together by screws 98 and nuts 100. The fluid unit 19 is mounted inside the second case unit 96b. The wall plate 106 of the fluid unit 19 is attached to the groove 84 around the end plate 80a. Thus, the channel member 108 is provided between the end plate 80a and the wall plate 106.

In the fuel cell system 10, as shown in FIG. 1, a fuel (methane, ethane, propane, or the like) and, as necessary, water, are supplied from the fuel gas supply pipe 110, and an oxygen-containing gas (hereinafter referred to simply as "air") is supplied from the air supply pipe 114.

The fuel is reformed as it passes through the reformer 16, thereby producing a fuel gas (hydrogen-containing gas). The fuel gas is supplied to the fuel gas supply passage 30 of the fuel cell stack 12. The fuel gas moves in the stacking direction, as indicated by the arrow A, and flows into the fuel gas supply channel 58 through the separator 28 of each fuel cell 11 (see FIG. 7).

The fuel gas flows along the fuel gas supply channel 58 between the first and second bridges 34, 64, and flows into the fuel gas inlets 38 of the circular disks 36. Thus, the fuel gas is supplied to the fuel gas channel 46 on each of the circular disks 36. The fuel gas inlets 38 are formed at positions corresponding to substantially central positions of the anodes 24 of the electrolyte electrode assemblies 26. Thus, the fuel gas is supplied from the fuel gas inlets 38 and to substantially central regions of the anodes 24, and flows outwardly from the central regions of the anodes 24.

Specifically, as shown in FIG. 5, the fuel gas channel 46 includes the ring shaped grooves 48a to 48f. First, the fuel gas is supplied to the ring shaped groove 48a through the connection groove 52, which is connected to the circular groove 51 around the fuel gas inlet 38. After the fuel gas flows through the ring shaped groove 48a, the fuel gas flows outwardly temporarily through the connection groove 52, and then is supplied to the ring shaped groove 48b outside the ring shaped groove 48a. Thus, the fuel gas then flows along the ring shaped groove 48b.

Further, the fuel gas, which is supplied to the ring shaped groove 48c outside the ring shaped groove 48b through the connection groove 52, flows along the other ring shaped grooves 48d to 48f through the connection groove 52. Therefore, the fuel gas is supplied outwardly from the substantially central region of the anode 24. After being consumed, the fuel gas is discharged through the discharge groove 54.

As shown in FIG. 1, air from the air supply pipe 114 flows through the channel 118 of the heat exchanger 14, and temporarily flows into the chamber 108a. The air flows through the holes 90, which are connected to the chamber 108a, and is supplied to the oxygen-containing gas supply unit 74, which is disposed substantially at the center of the fuel cells 11. At this time, in the heat exchanger 14, as described later, since the exhaust gas discharged to the exhaust gas channel 78 flows through the channel 120, heat exchange is performed between the air before it is supplied to the fuel cells 11 and the exhaust gas. Therefore, the air is heated to a desired fuel cell operating temperature beforehand.

The oxygen-containing gas, which is supplied to the oxygen-containing gas supply unit 74, flows into the space between the inner circumferential edge of the electrolyte electrode assembly 26 and the inner circumferential edge of the circular disk 36, in the direction indicated by the arrow B, and then flows toward the oxygen-containing gas channel 70 formed by the mesh member 72. As shown in FIG. 7, in the oxygen-containing gas channel 70, the oxygen-containing gas flows from an inner circumferential edge (central region of the separator 28) toward an outer circumferential edge (outer region of the separator 28) and, more specifically, from one end to the other end of the outer circumferential region of the cathode 22 of the electrolyte electrode assembly 26.

Thus, in the electrolyte electrode assembly 26, the fuel gas flows from the central region to the outer circumferential region of the anode 24, and the oxygen-containing gas flows in one direction indicated by the arrow B along the electrode surface of the cathode 22. At this time, oxygen ions flow through the electrolyte 20 toward the anode 24, in order to generate electricity as a result of electrochemical reactions therebetween.

The air and the fuel gas consumed in the reaction are discharged to the outside of the respective electrolyte electrode assemblies 26, as an exhaust gas, and the exhaust gas flows through the exhaust gas channel 78 in the stacking direction. When the exhaust gas flows through the channel 120 of the heat exchanger 14, heat exchange is carried out between the exhaust gas and the air. Then, the exhaust gas is discharged into the exhaust gas pipe 116 (see FIG. 1).

In the first embodiment, the leakage ratio of the fuel gas, which leaks from the respective ring shaped grooves 48a to 48f to the ridges 50b to 50g, is uniform over the entire surface of the anode 24.

More specifically, the leakage ratio can be calculated roughly by the following equation:

leakage ratio=$Wr/Wh$ in which Wr represents the leakage flow rate of the fuel gas leaked from the fuel gas channel 46, and Wh represents the total flow rate of the fuel gas supplied to the fuel gas channel 46.

Figure 8:
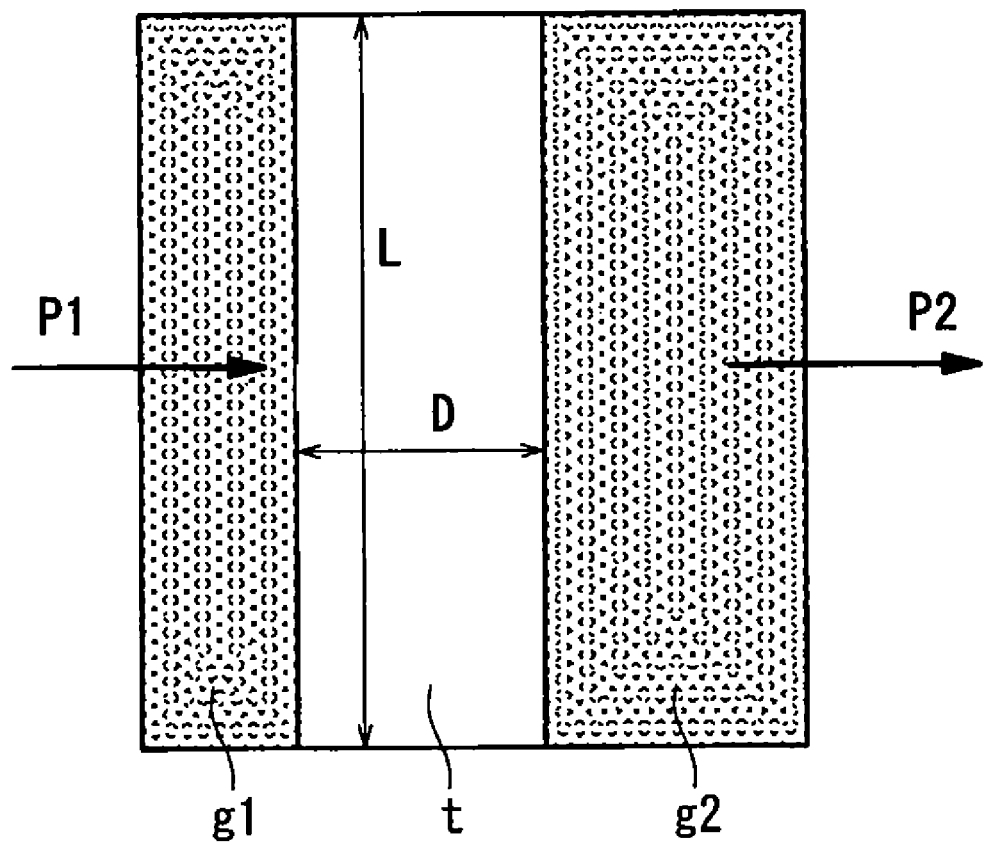
FIG. 8 is a view for explaining the leakage flow rate.

As shown in FIG. 8, the leakage flow rate is proportional to the differential pressure ΔP (P1−P2) between the pressure P1 of the groove g1 and the pressure P2 of the groove g2, and to the length L of the ridge t. On the other hand, the differential pressure ΔP is inversely proportional to the surface pressure, and to the width D of the ridge t. Hence, the following relationship is satisfied:

leakage flow rate∝$\Delta P \times L$/surface pressure×$D$ wherein ΔP represents the differential pressure, L the length of the ridge t, and D the width of the ridge t.

Thus, in the first embodiment, since the length L of the ring shaped grooves 48a to 48f grows larger, the groove width (width D) of the ring shaped grooves 48a to 48f is increased gradually, from the ring shaped groove 48a to the ring shaped groove 48f. Likewise, since the length L of the ridges 50a to 50g grows larger, the width of the ridges 50a to 50g is increased gradually, from the ridge 50a to the ridge 50a.

At this time, the cross sectional area of the opening of the ring shaped groove 48a is equal to the surface area of the ridge 50b. The opening areas of the ring shaped grooves 48b to 48f are equal respectively to the surface areas of the ridges 50b to 50g over the entire surface of the anode 24. Further, the surface area of the opening of the circular groove 51 is equal to the surface area of the ridge 50a.

Figure 9:
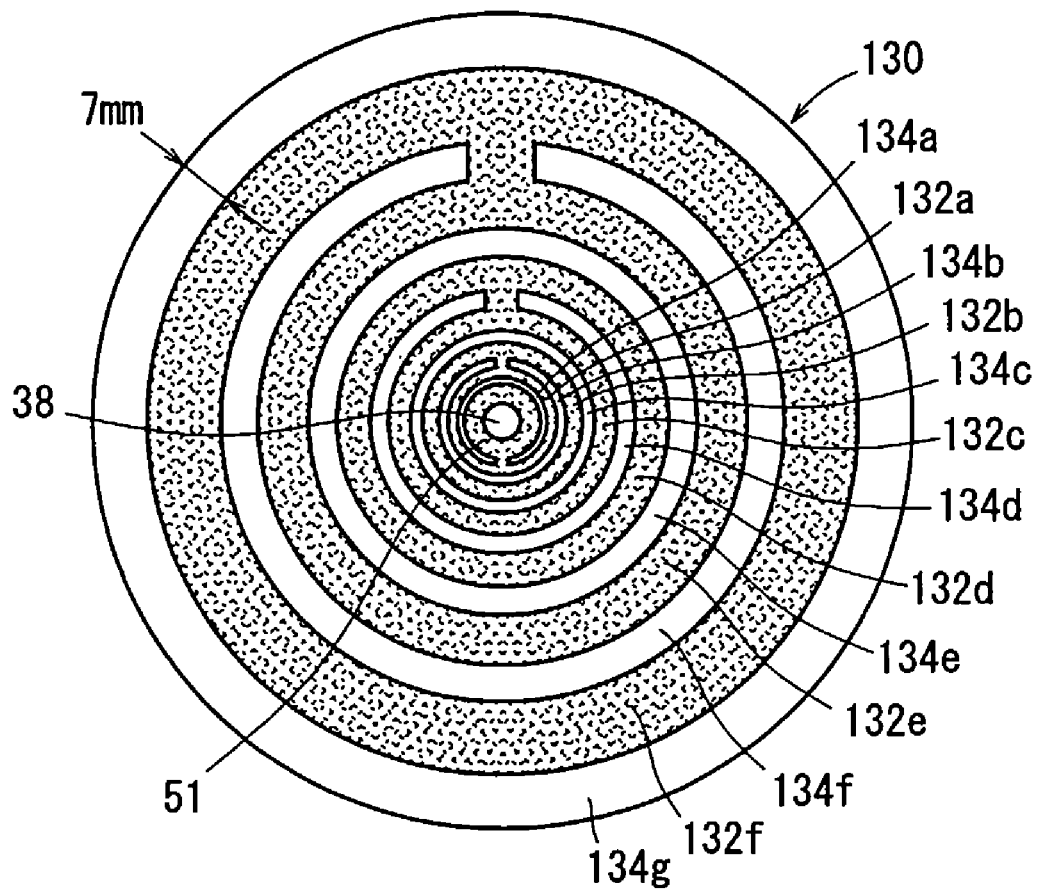
FIG. 9 is a view showing the embodiment of the present invention.

Serving as one example of the embodiment, a fuel gas channel 130 as shown in FIG. 9 was used. In the fuel gas channel 130, the diameter of the electrolyte electrode assembly 26 was 100 mm, wherein ring shaped grooves 132a to 132f were provided concentrically around the fuel gas inlet 38, and ridges 134a to 134g were provided respectively adjacent to the ring shaped grooves 132a to 132f.

The width of the outermost ridge 134g was 7 mm. The percentage of the flow field in the surface area was 50%, i.e., the opening areas of the ring shaped grooves 132a to 132f were equal to the surface areas of the ridges 134a to 134g. The leakage ratio was 4%. Further, the surface area of the outermost ridge 134g was equal to the opening area of the adjacent ring shaped groove 132f inside the ridge 134g.

Likewise, the surface area of the ridge 134f was equal to the opening area of the ring shaped groove 132e, the surface area of the ridge 134e was equal to the opening area of the ring shaped groove 132d, the surface area of the ridge 134d was equal to the opening area of the ring shaped groove 132c, the surface area of the ridge 134c was equal to the opening area of the ring shaped groove 132b, and the surface area of the ridge 134b was equal to the opening area of the ring shaped groove 132a. FIG. 10 shows settings provided to satisfy these conditions.

In the embodiment, the leakage ratio can be kept at a certain level (about 4%) over the entire anode 24, and the fuel gas is distributed uniformly over the entire anode 24. In particular, in the ring shaped grooves 132a to 132f, the fuel gas does not pass beyond the ridges 134b to 134f that extend from the inner side to the outer side, and the fuel gas is not emitted to the outside from the outermost ring shaped groove 132f beyond the ridge 134g.

Thus, the fuel gas flows uniformly along the ring shaped grooves 132a to 132f. Accordingly, the fuel gas is supplied suitably and uniformly to the entire surface of the anode 24, so as to achieve a uniform power generation reaction, whereby the fuel gas utilization ration can be improved.

Further, improvements in the performance of collecting electricity generated during the power generation reaction are achieved. The load in the stacking direction is transmitted suitably from the anode 24 to the cathode 22. Therefore, the separator 28 is maintained in tight contact with the electrolyte electrode assembly 26.

FIG. 11 shows a fuel gas channel 130a according to a first comparative example. In the fuel gas channel 130a, ring shaped grooves 136a, 136b having the same groove width, and ridges 138a to 138c, were arranged alternately. The leakage ratio of the fuel gas leaked from the outermost ring shaped groove 136b to the ridge 138c is 4%, which is the same as the leakage ratio in the exemplary embodiment discussed above. FIG. 12 shows the settings that satisfy these conditions.

In the first comparative example, the leakage ratio in the outermost region of the fuel gas channel 130a was 4%, and the ring shaped grooves 136a, 136b had the same groove width. Thus, in effect, the number of circular grooves around the fuel gas inlet 38 is two, i.e., only the ring shaped grooves 136a and 136b were provided around the fuel gas inlet 38. Therefore, the number of circular grooves around the fuel gas inlet 38 was small in comparison with the exemplary embodiment. Thus, the fuel gas did not flow uniformly over the entire surface of the anode 24, and the fuel gas was distributed non-uniformly.

Further, FIG. 13 shows a fuel gas channel 130b in accordance with a second comparative example. In the fuel gas channel 130b, ring shaped grooves 137a to 137f and ridges 139a to 139g were arranged alternately. The ring shaped grooves 137a to 137f had the same groove width. The ridges 139a to 139f had the same width. Only the outermost ridge 139g had a width that was equal to the width of the ridge 134g in the exemplary embodiment. FIG. 14 shows settings that satisfy these conditions.

In the second comparative example, leakage of the fuel gas from the central region of the anode 24 to the outer circumferential region was large. In particular, the fuel gas easily leaked beyond the ridges 139a to 139f provided on the inner side toward the ring shaped grooves 137a to 137f provided on the outer circumferential side. Thus, the fuel gas did not flow uniformly through the respective ring shaped grooves 137a to 137f, and the fuel gas was distributed non-uniformly.

In the first embodiment, as shown in FIG. 5, each of the ring shaped grooves 48a to 48f forms bifurcated grooves through the connection groove 52. Thus, in each of the bifurcated grooves, the flow rate and the groove length become ½, and the overall pressure loss becomes ¼. The pressure loss is reduced in each of the ring shaped grooves 48a to 48f, and the groove depth is reduced. Accordingly, the overall thickness of the separators 28 becomes small, and a reduction of heat mass is achieved easily.

Further, in the first embodiment, the cathode 22 of the electrolyte electrode assembly 26 contacts the mesh member 72. In this state, a load in the stacking direction, as indicated by the arrow A, is applied to the components of the fuel cell 11. Since the mesh member 72 is deformable, the mesh member 72 remains in tight contact with the cathode 22.

In this structure, dimensional errors or distortions, which may occur when producing the electrolyte electrode assembly 26 or the separator 28, can suitably be absorbed by elastic deformation of the mesh member 72. Thus, in the first embodiment, damage that could occur when stacking the components of the fuel cell 11 is prevented. Since the components of the fuel cell 11 are in contact with each other at many points, an improvement in performance of collecting electricity from the fuel cell 11 can be achieved.

Further, the area occupied by the mesh member 72 is smaller than the power generation area of the anode 24 (see FIG. 6). Therefore, even if the exhaust gas flows around to the anode 24 from the outside of the electrolyte electrode assembly 26, the power generation area does not exist along the outer circumferential edge of the cathode 22 opposite to the outer circumferential edge of the anode 24. Thus, fuel consumption by the circulating current does not increase significantly, and a large electromotive force can easily be collected. Accordingly, electricity collection performance is improved, and an advantageous fuel utilization ratio can be achieved. Further, the present invention can be carried out easily, simply by using the mesh member 72 as an elastic channel member. Thus, the structure of the present invention is both simple and cost effective.

In particular, even when an electrolyte electrode assembly 26 with small strength, having a thin electrolyte 20 and a thin cathode 22 (i.e., a so called support membrane type MEA) is used, stresses applied to the electrolyte 20 and the cathode 22 by the mesh member 72 are moderate, thus advantageously reducing damage to the electrolyte electrode assembly 26.

Figure 15:
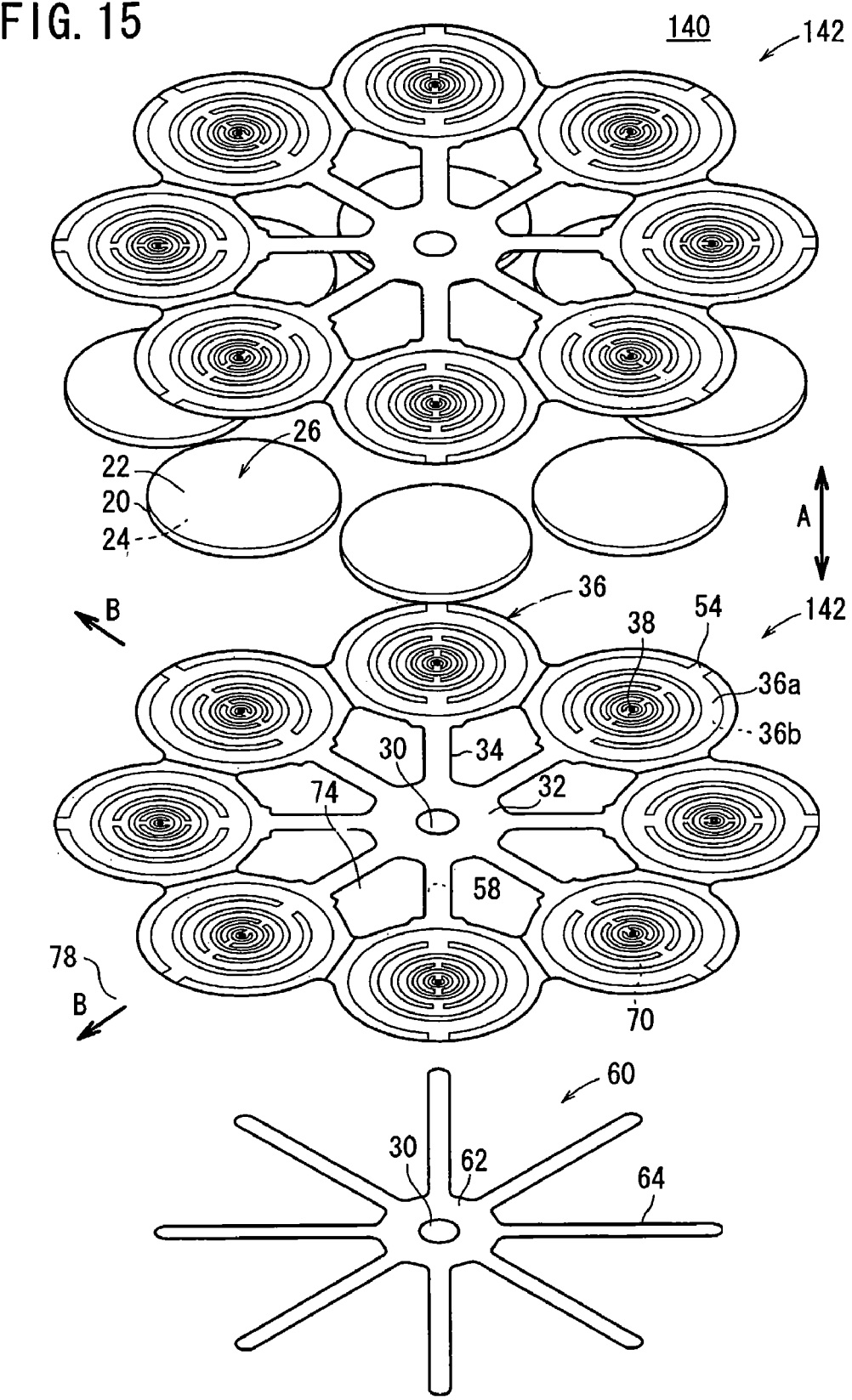
FIG. 15 is an exploded perspective view showing a fuel cell according to a second embodiment of the present invention.

FIG. 15 is an exploded perspective view showing a fuel cell 140 according to a second embodiment of the present invention. Constituent elements that are identical to those of the fuel cell 11 according to the first embodiment shall be labeled using the same reference numerals, and descriptions thereof shall be omitted. Further, in the third and fourth embodiments to be described later, constituent elements that are identical to those of the fuel cell 11 according to the first embodiment shall be labeled using the same reference numerals, and descriptions thereof shall be omitted.

Figure 16:
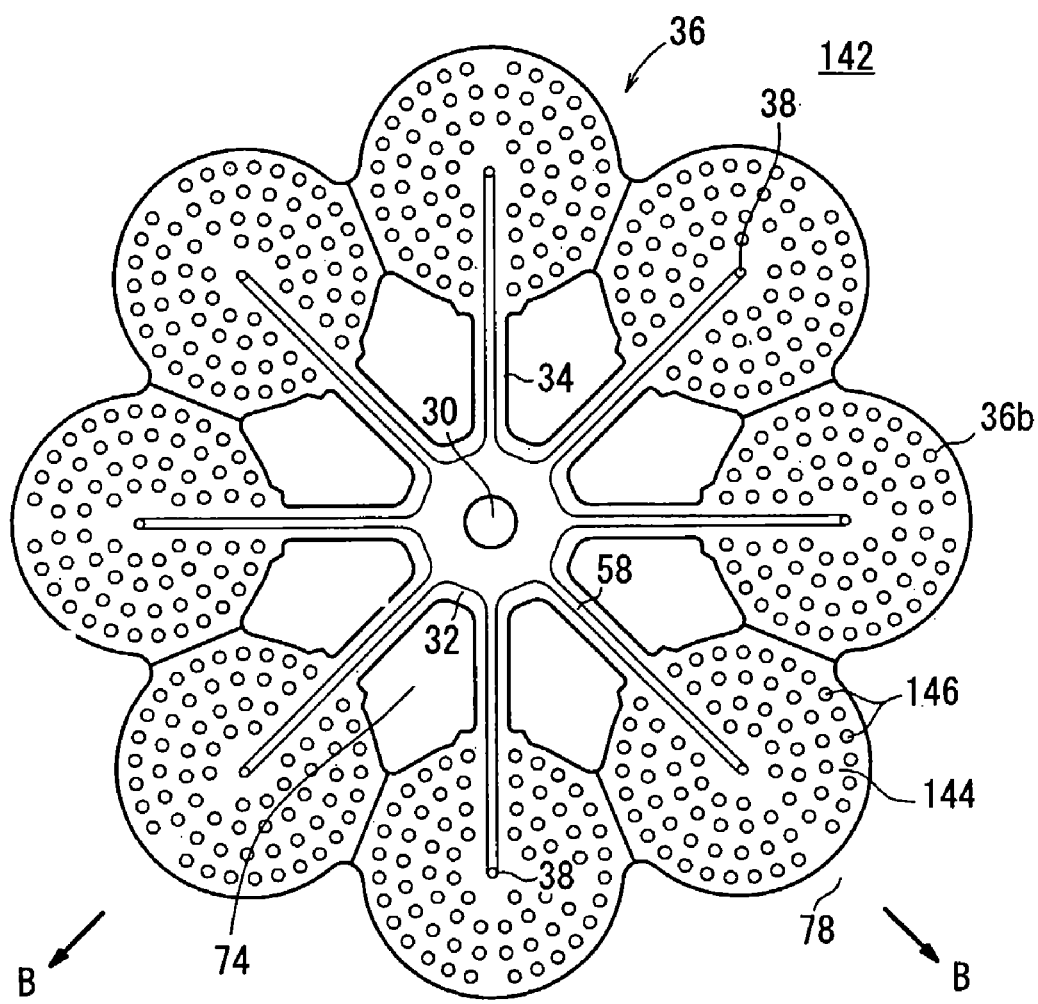
FIG. 16 is a frontal view showing a separator of the fuel cell.
Figure 17:
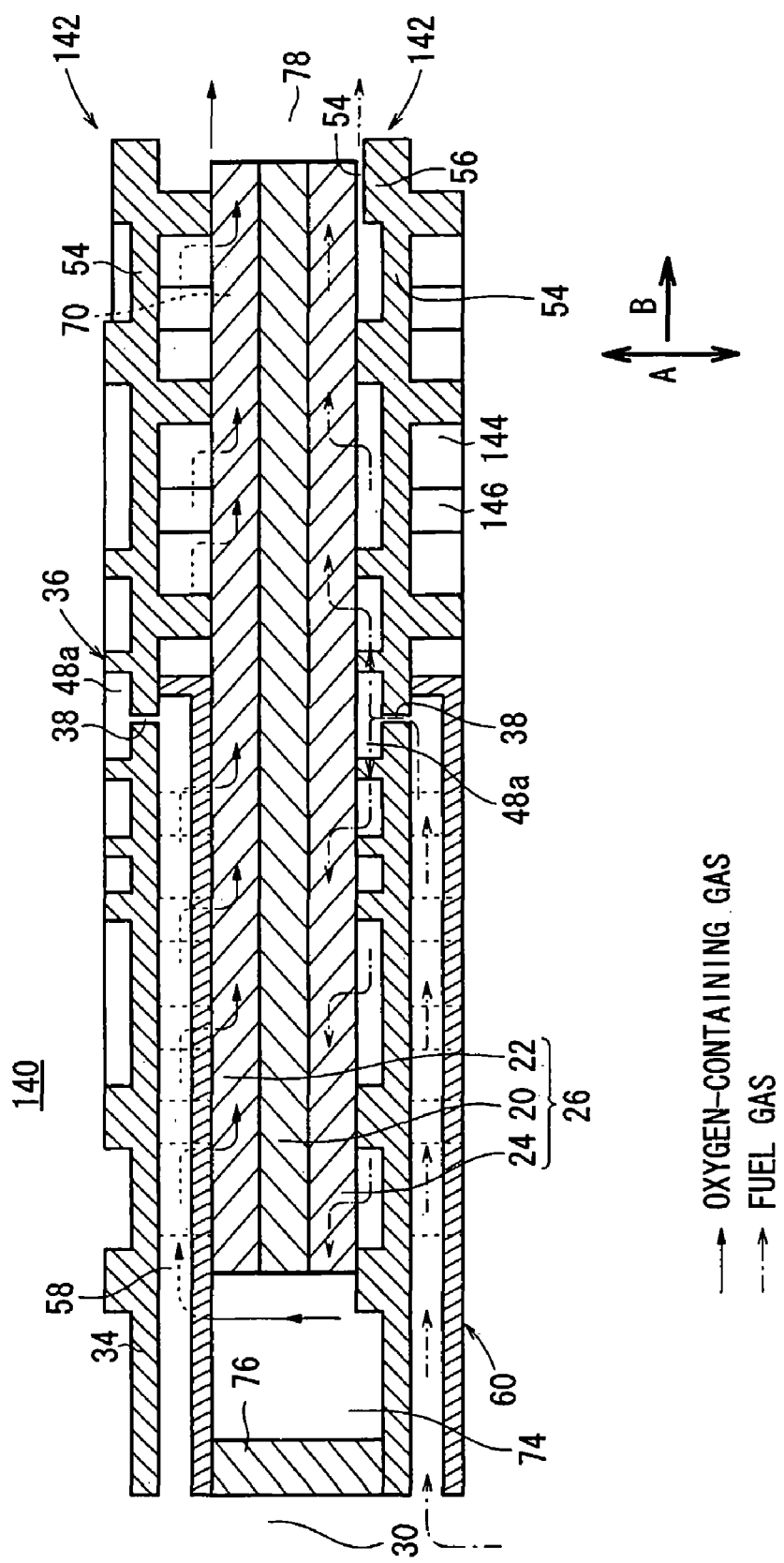
FIG. 17 is a cross sectional view schematically showing operations of the fuel cell.

The fuel cell 140 has a separator 142, wherein an oxygen-containing gas channel 144 is formed on a surface 36b of each of circular disks 36 of the separator 142 so as to face the cathodes 22. The oxygen-containing gas channel 144 is formed by a plurality of protrusions 146 formed on the surface 36b (see FIGS. 16 and 17).

The protrusions 146 are solid portions formed, for example, by etching on the surface 36b. Various shapes, such as a rectangular shape, a circular shape, or a triangular shape, may be used for the cross sectional shapes of the protrusions 146. The positions or density of the protrusions 146 can be changed arbitrarily, depending on the flow state and/or fluidic conditions of the oxygen-containing gas or the like.

In the second embodiment, the load in the stacking direction is efficiently transmitted through the protrusions 146 of the circular disk 36. Therefore, the fuel cells 140 can be stacked together with a small load, thereby reducing distortions in the electrolyte electrode assemblies 26 and the separators 142.

The protrusions 146 on the surface 36b of the circular disk 36 are formed by etching or the like as solid portions. Thus, the shape, positions, and density of the protrusions 146 can be changed arbitrarily and easily, depending on the flow state and/or fluidic conditions of the oxygen containing gas, whereby a desired flow of the fuel gas can be achieved. Further, since the protrusions 146 are formed as solid portions, the protrusions 146 cannot be deformed, and thus, the load is reliably transmitted through the protrusions 146, and electricity is collected efficiently through the protrusions 146.

Figure 18:
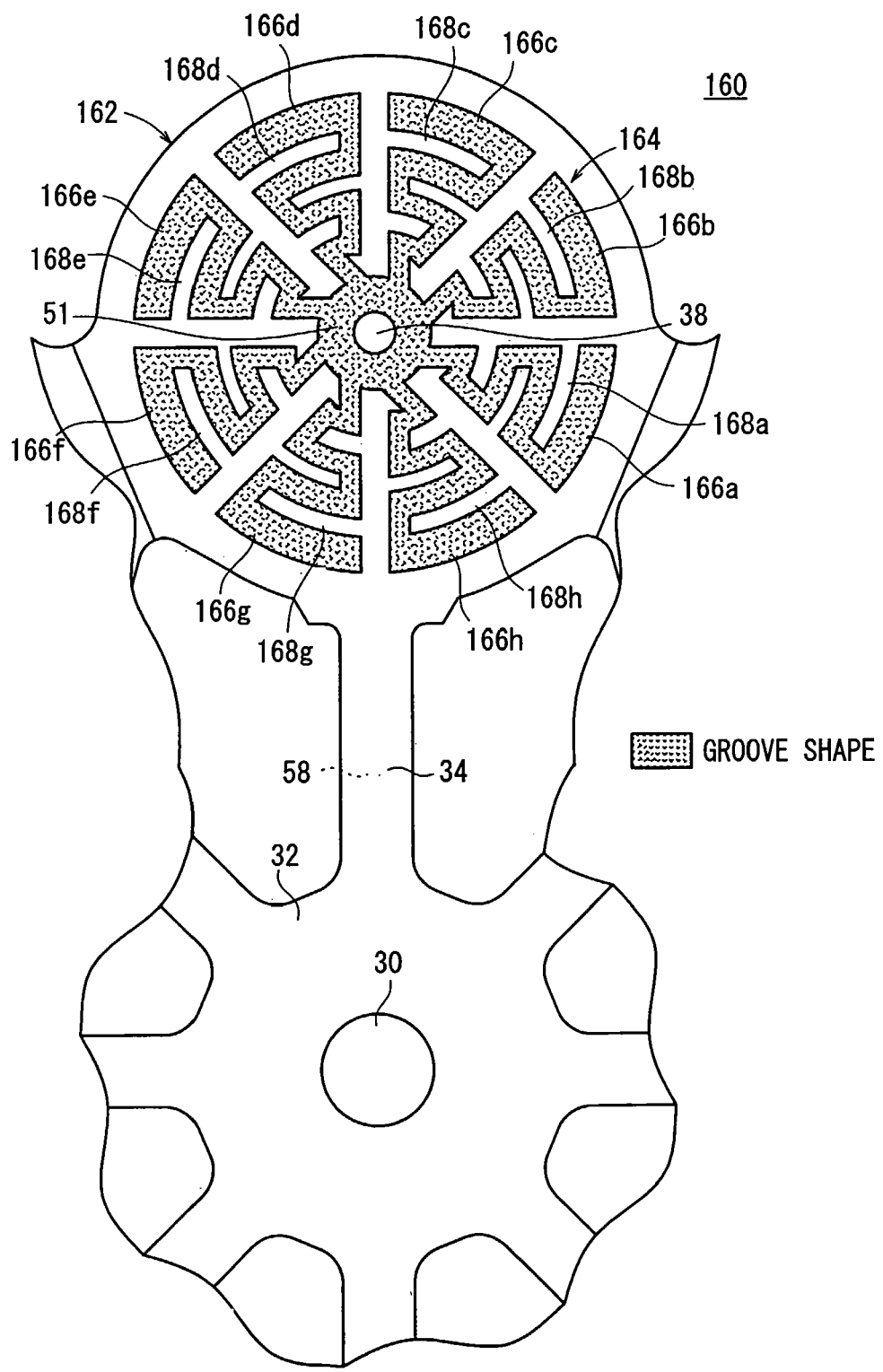
FIG. 18 is a partial enlarged view showing a separator of a fuel cell according to a third embodiment of the present invention.

FIG. 18 is a partial enlarged view showing a separator 160 of a fuel cell according to a third embodiment of the present invention.

A fuel gas channel 164 for supplying the fuel gas to the anode 24 is formed on each of circular disks 162 of the separator 160. The fuel gas channel 164 includes a plurality of grooves 166a to 166h arranged in a serpentine pattern branching from the fuel gas inlet 38. In each of the serpentine grooves 166a to 166h, the groove width of the arc-shaped portions, which are provided concentrically substantially around the fuel gas inlet 38, increases gradually toward the outer circumferential portion of the surface of the anode 24. The width of the ridges 168a to 168h formed between the grooves also increases gradually toward the outer circumferential portion of the surface of the anode 24.

In the third embodiment, the same advantages as those of the first and second embodiments can be obtained. For example, a change in the leakage amount of the fuel gas that leaks from the serpentine grooves 166a to 166h is suppressed effectively. Further, the fuel gas is supplied suitably and uniformly over the entire surface of the anode 24, whereby an improvement in the fuel gas utilization ratio is achieved. For example, the channel member 60 may be fixed to the separator 160 on the side of the fuel gas channel 164, at positions between the serpentine grooves 166g, 166h.

Figure 19:
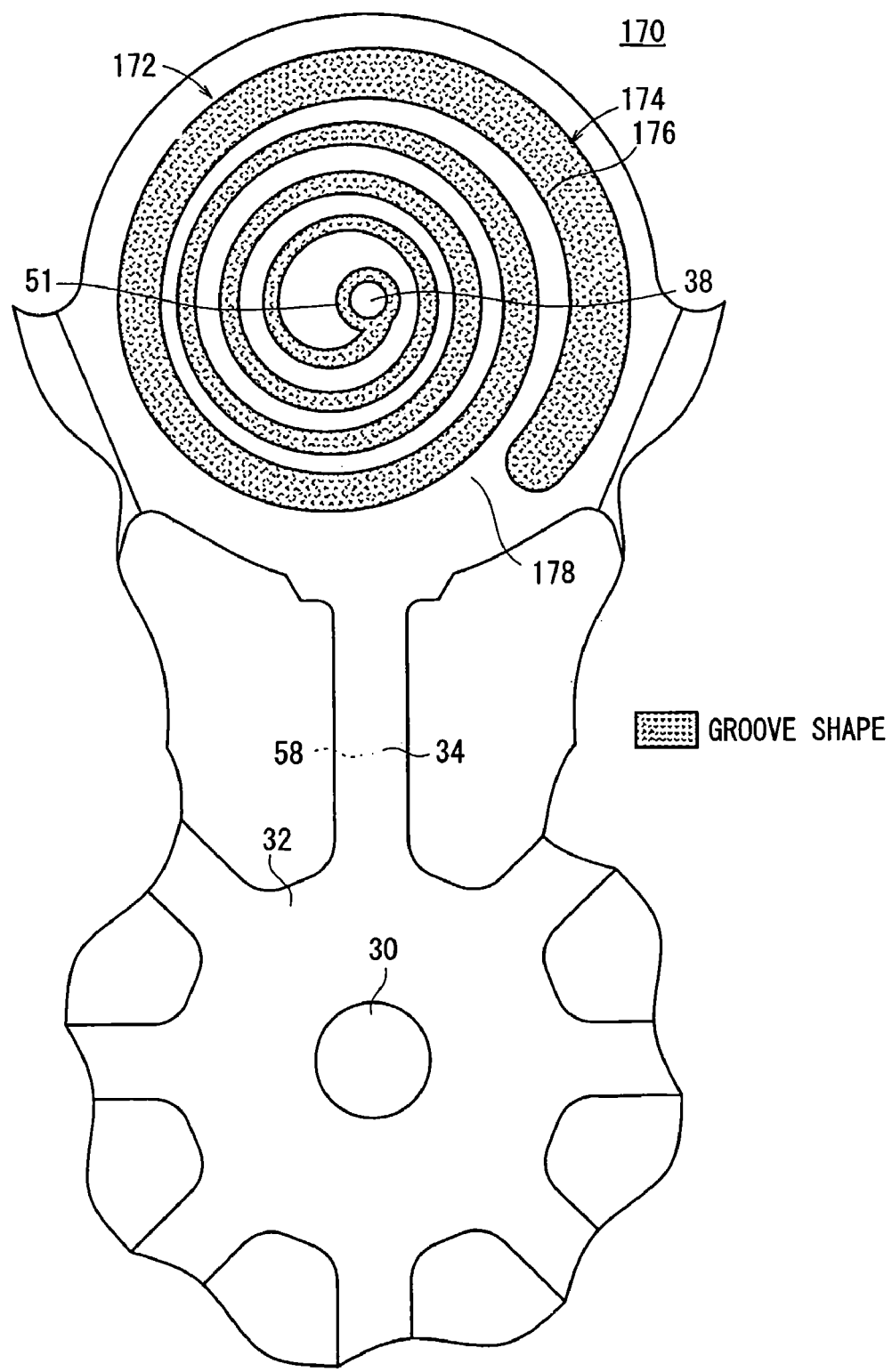
FIG. 19 is a partial enlarged view showing a separator of a fuel cell according to a fourth embodiment of the present invention.
Figure 20:
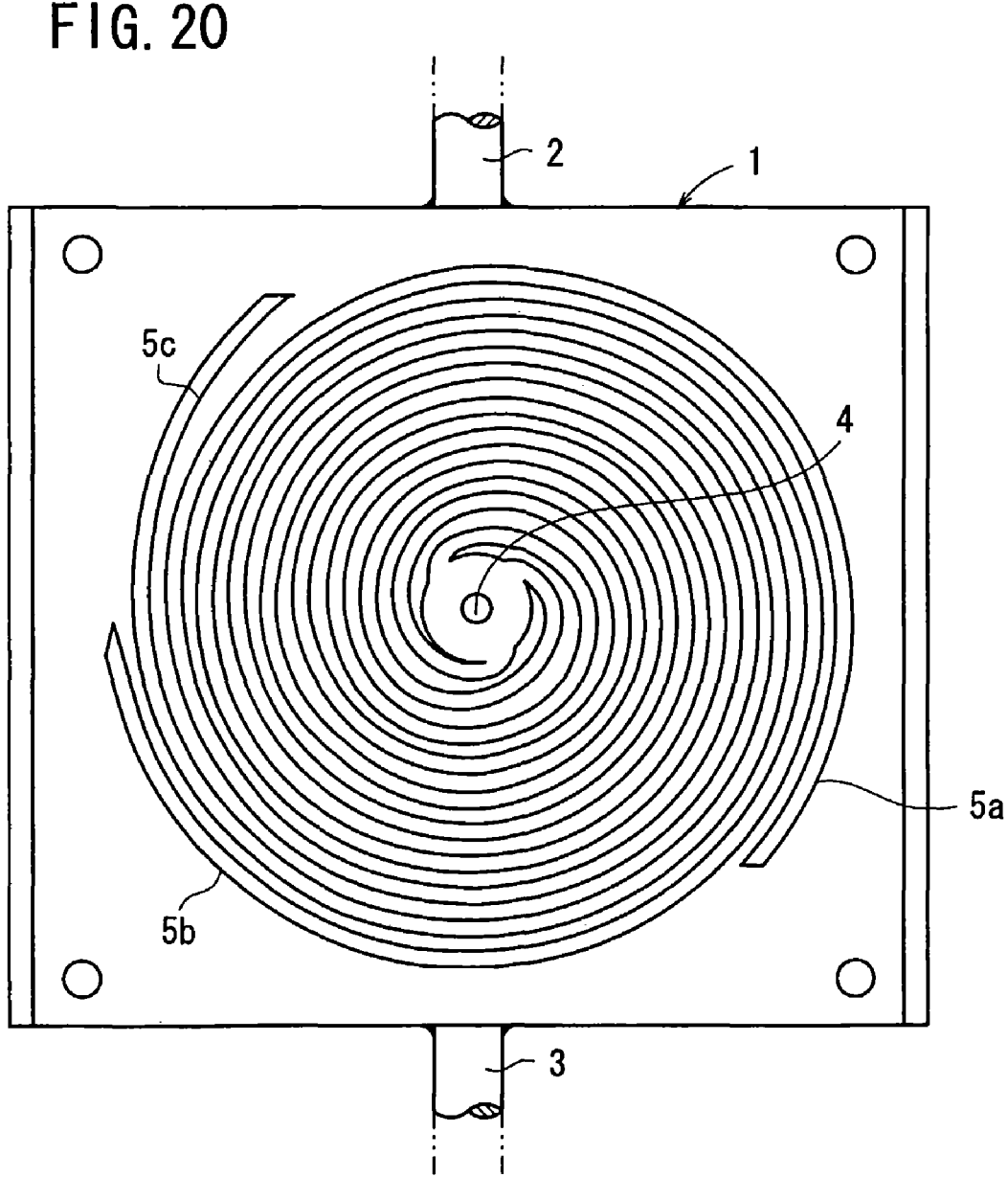
FIG. 20 is a view showing a conventional fuel cell.

FIG. 19 is a partial enlarged view showing a separator 170 of a fuel cell according to a fourth embodiment of the present invention.

A fuel gas channel 174 is formed on each of circular disks 172 of the separator 170. The fuel gas channel 174 includes a continuous spiral groove 176, extending around the fuel gas inlet 38, and a ridge 178. The width of the spiral groove 176 increases gradually from the fuel gas inlet 38 toward the outer circumferential portion of the separator 170.

Thus, in the spiral groove 176, the leakage ratio does not change from the inner side to the outer circumferential side. Thus, the same advantages as those of the first to third embodiments can be obtained. For example, the fuel gas is suitably supplied uniformly over the entire surface of the anode 24.

The invention claimed is:

1. A fuel cell formed by stacking an electrolyte electrode assembly and a separator, said electrolyte electrode assembly including an anode, a cathode, and an electrolyte interposed between said anode and said cathode, said fuel cell further comprising:
a fuel gas channel being formed on one surface of said separator for supplying a fuel gas from a center to an outer circumferential portion along a surface of said anode;
an oxygen-containing gas channel being formed on the other surface of said separator for supplying an oxygen-containing gas along a surface of said cathode, said separator having a fuel gas inlet for supplying the fuel gas before consumption to said fuel gas channel,
wherein said fuel gas channel comprises grooves and ridges provided alternately toward the outer circumferential portion on the surface of said anode,
wherein the grooves comprise a plurality of ring shaped grooves formed around said fuel gas inlet and a single connection groove connecting adjacent ring shaped grooves,
wherein said single connection grooves are arranged on a front side and a back side alternately of connecting adjacent ring shaped grooves, and
wherein a groove width of adjacent grooves arranged between said ridges increases gradually toward said outer circumferential portion on the surface of said anode.

2. A fuel cell according to claim 1, wherein the adjacent grooves arranged between said ridges have a same leakage ratio over the entire surface of said anode.

3. A fuel cell according to claim 1, wherein an opening area of said grooves and a surface area of said ridges are the same over the entire surface of said anode.

4. A fuel cell according to claim 1, wherein said fuel gas inlet is provided at a position corresponding to the center of the surface of said anode.

5. A fuel cell according to claim 4, wherein said grooves comprise a continuous spiral groove extending in a spiral pattern around said fuel gas inlet.

6. A fuel cell according to claim 1, further comprising a fuel gas channel member provided on the other surface of said separator, and having a fuel gas supply channel for supplying the fuel gas to said fuel gas inlet.

7. A fuel cell according to claim 1, wherein said oxygen-containing gas channel comprises a deformable elastic channel member, which is provided on the other surface of said separator, in tight contact with said cathode.

8. A fuel cell according to claim 7, wherein an area in which said elastic channel member is disposed is smaller than a power generation area of said anode.

9. A fuel cell according to claim 8, wherein said elastic channel member comprises an electrically conductive mesh member.

10. A fuel cell according to claim 1, wherein said oxygen-containing gas channel is formed by a plurality of protrusions provided on the other surface of said separator.

11. A fuel cell according to claim 10, wherein said protrusions comprise a plurality of solid portions formed on one surface of said separator by etching.

* * * * *